(12) United States Patent
Nakayama et al.

(10) Patent No.: US 8,350,923 B2
(45) Date of Patent: Jan. 8, 2013

(54) CAMERA SYSTEM AND MOBILE CAMERA SYSTEM

(75) Inventors: Nobutaka Nakayama, Kanagawa (JP); Katsumi Katoh, Kanagawa (JP); Kazushi Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 11/805,875

(22) Filed: May 24, 2007

(65) Prior Publication Data

US 2007/0285282 A1   Dec. 13, 2007

(30) Foreign Application Priority Data

May 31, 2006   (JP) ................. P2006-152413

(51) Int. Cl.
*H04N 9/73* (2006.01)
*H04N 9/68* (2006.01)
*H04N 7/18* (2006.01)
*G08G 1/017* (2006.01)

(52) U.S. Cl. ............... 348/223.1; 348/234; 348/153; 340/937

(58) Field of Classification Search .......... 348/113–124, 348/143, 169, 222.1, 211.11, 231.6, 234, 348/239, 255, 362, 207.99; 340/937
See application file for complete search history.

(56) References Cited

U.S. PATENT DOCUMENTS

| | | | |
|---|---|---|---|
| 5,892,855 A * | 4/1999 | Kakinami et al. | 382/291 |
| 6,903,735 B2 * | 6/2005 | Jeong et al. | 345/418 |
| 6,990,253 B2 * | 1/2006 | Takeda et al. | 382/276 |
| 7,259,784 B2 * | 8/2007 | Cutler | 348/223.1 |
| 7,570,286 B2 * | 8/2009 | Koike et al. | 348/235 |
| 7,599,521 B2 * | 10/2009 | Watanabe et al. | 382/104 |
| 2002/0047901 A1 * | 4/2002 | Nobori et al. | 348/149 |
| 2004/0085451 A1 * | 5/2004 | Chang | 348/159 |
| 2005/0036044 A1 * | 2/2005 | Funakura | 348/239 |
| 2005/0259176 A1 * | 11/2005 | Kyuma | 348/362 |

FOREIGN PATENT DOCUMENTS

| | | |
|---|---|---|
| JP | 09-084056 | 3/1997 |
| JP | 11-146415 | 5/1999 |
| JP | 2000-341719 | 12/2000 |
| JP | 2001-245131 | 9/2001 |
| JP | 2002-324235 | 11/2002 |
| JP | 3297040 | 11/2002 |
| JP | 2003-233101 | 8/2003 |
| JP | 2003-324649 | 11/2003 |

* cited by examiner

*Primary Examiner* — Trung Diep
(74) *Attorney, Agent, or Firm* — Robert J. Depke; Rockey, Depke & Lyons, LLC

(57) ABSTRACT

A mobile camera system is disclosed. The camera system connects plural camera apparatuses including at least first and second camera apparatuses mounted on a mobile body to one another and combines images photographed by the first and the second camera apparatuses, wherein reference data obtained by the first camera apparatus is transferred to the second camera apparatus via a camera control unit, signal processing is performed in the second camera apparatus on the basis of the reference data transferred to generate a corrected image, and an image from the first camera apparatus and the corrected image outputted from the second camera apparatus are combined to output a combined image.

19 Claims, 8 Drawing Sheets

CAMERA SYSTEM AND MOBILE CAMERA SYSTEM

CROSS-REFERENCES TO RELATED APPLICATIONS

The present invention contains subject matter related to Japanese Patent Application JP 2006-152413 filed in the Japanese Patent Office on May 31, 2006, the entire contents of which being incorporated herein by reference.

BACKGROUND OF THE INVENTION

1. Field of the Invention

The present invention relates to a camera system and a mobile camera system, and, more particularly to a camera system and a mobile camera system in which plural imaging apparatuses are provided in a mobile body, a reference imaging apparatus is set for the plural imaging apparatuses, reference data of the reference imaging apparatus is transferred to the other imaging apparatuses via a control unit, the imaging apparatuses independently perform image processing on the basis of the reference data, and images are combined via the control unit to improve an image quality of a combined image.

2. Description of the Related Art

An image combining and displaying apparatus 800 of a vehicle-mounted camera apparatus in the past disclosed in Japanese Patent No. 3297040 is shown in FIG. 11. In this image combining and displaying apparatus 800, outputs of the cameras CAM1 to CAM8 (801 to 808) are connected to an image combining and displaying device 820 in a vehicle. The image combining and displaying device 820 is connected to a monitor device 816. Photographing areas of the cameras CAM1 to CAM8 (801 to 808) are set to overlap one another.

The image combining and displaying device 820 includes image memories 821 to 828 that store images supplied from the cameras CAM1 to CAM8 (801 to 808). The image memories 821 to 828 are connected to an image extracting and combining unit 813. Outputs of the image extracting and combining unit 813 are connected to correction-signal generating means 814 and image correcting means 815. The correction-signal generating means 814 is connected to the image correcting means 815. The correction-signal generating means 814 corrects a combined image outputted from the image extracting and combining unit 813 according to a control signal supplied from the image extracting and combining unit 813 and outputs the combined image to the monitor device 816.

Images outputted from the cameras CAM1 to CAM8 (801 to 808) are stored in the image memories 821 to 828, respectively, and the images are outputted to the image extracting and combining unit 813. The image extracting and combining unit 813 calculates correction gains of the images supplied from the image memories 821 to 828. The image correcting means 815 corrects a combined image on the basis of a correction gain coefficient.

In this way, in Japanese Patent No. 3297040, rather than performing image correction in the cameras CAM1 to CAM8 (801 to 808), images supplied from the cameras are corrected in the image combining and displaying device 820 equivalent to a camera control unit.

For a driver of a mobile body, for example, an automobile, it is difficult to visually recognize the rear of the automobile when the driver backs the automobile. The driver has a blind spot. Even while the driver drives forward, when a vehicle running beside the automobile comes to a position hidden behind a door mirror, the vehicle disappears from a visual field of the driver.

Therefore, in recent years, a vehicle-mounted camera for monitoring peripheries of own vehicle located in a blind spot of a driver is mounted on the vehicle and a photographed image of the vehicle-mounted camera is displayed on a display screen for car navigation.

Moreover, a technique for recognizing, when plural camera apparatuses are connected, a common portion of images combined and reducing differences in luminances and tints between camera images adjacent to each other is disclosed.

SUMMARY OF THE INVENTION

As the plural vehicle-mounted camera apparatuses mounted on the vehicle, cameras of an identical model are used. However, balances of luminances and tints are different for each of the cameras because of differences in positions where the camera apparatuses are arranged and subjects to be photographed by the camera apparatuses. Therefore, it is difficult for the driver to visually recognize a display image.

In general, in a camera system that has plural camera apparatuses that are set in different places and photograph different objects, when images photographed by the plural camera apparatuses are combined, differences in luminances and tints are consciously seen in joints among images. If exposure times and gains of the respective camera apparatuses are controlled at the same level, differences in colors and brightness among the camera apparatuses are observed. However, it is difficult to see portions that should have originally been seen if the camera apparatuses were separately controlled.

For example, in FIG. 11, when a subject of the CAM1 (801) is in the shade and a subject of the CAM2 (802) is in the sun and when the CAM2 (802) is controlled at the same level as an exposure time and a gain of the CAM1 (801), a white void is formed in an image of the CAM2 (802). This makes it difficult to recognize the image.

As disclosed in Japanese Patent No. 3297040, it is necessary to provide the image memories 821 to 828 that store output signals from the cameras CAM1 to CAM8 (801 to 808) in the image combining and displaying apparatus 820, store images from the camera apparatuses, and set overlapping imaging areas of the camera apparatuses. It is also necessary to change the overlapping imaging areas according to attaching positions of the camera apparatuses.

Therefore, it is desirable to make it possible to, regardless of attaching positions of camera apparatuses, perform adjustment of luminances and colors among cameras adjacent to one another when camera images are combined.

Luminances and colors are adjusted in the respective camera apparatuses. A C/U (Camera Control Unit) provided in a vehicle or a specific location receives reference data of luminance and color signals from a camera apparatus set as a master (a reference) and transfers the reference data to the other camera apparatuses. This makes it possible to reduce loads on the C/U.

According to an embodiment of the invention, there is provided a mobile camera system that connects first and second camera apparatuses mounted on a mobile body to each other and combines images photographed by the first and the second camera apparatuses. Reference data obtained by the first camera apparatus is transferred to the second camera apparatus via a camera control unit. Signal processing is performed in the second camera apparatus on the basis of the reference data transferred, and images outputted from the first and the second camera apparatuses are combined to perform, regardless of setting locations of the first and the second camera apparatuses, image adjustment among camera apparatuses adjacent to one another when the camera images are combined.

According to another embodiment of the invention, there is provided a mobile camera system including a mobile body, plural camera apparatuses that are set in the mobile body and have signal processing units that adjust image signals, a camera control unit that arbitrarily selects a first camera apparatus set as a reference out of the plural camera apparatuses, is supplied with reference data from the first camera apparatus, and transfers the reference data for correcting an image signal of a second camera apparatus to the second camera apparatus, the second camera apparatus independently correcting image signals inputted to the respective camera apparatuses on the basis of the reference data, and a display device on which images outputted from the first camera apparatus and the second camera apparatus are combined and the combined image is displayed.

According to still another embodiment of the invention, there is provided a camera system including a first camera apparatus and a second camera apparatus. The first camera apparatus sends reference data obtained from an image photographed to the second camera apparatus. The second camera apparatus generates a corrected image on the basis of the photographed image and the reference data. A first image from the first camera apparatus and the corrected image are combined by control means to generate a combined image. According to the embodiments of the invention, the respective camera apparatuses are properly controlled and a clear combined image is outputted. It is possible to eliminate a sense of incongruity about colors and brightness in joint portions of images.

By making it possible to select on which of colors and luminances importance should be placed and adjust a balance between the colors and the luminances, it is possible to independently control the adjustment of the colors and the luminances in the respective camera apparatuses. The respective camera apparatuses can independently control the adjustment of the colors and the luminances without being aware of attaching positions thereof.

DESCRIPTION OF THE PREFERRED EMBODIMENTS

Figure 1:
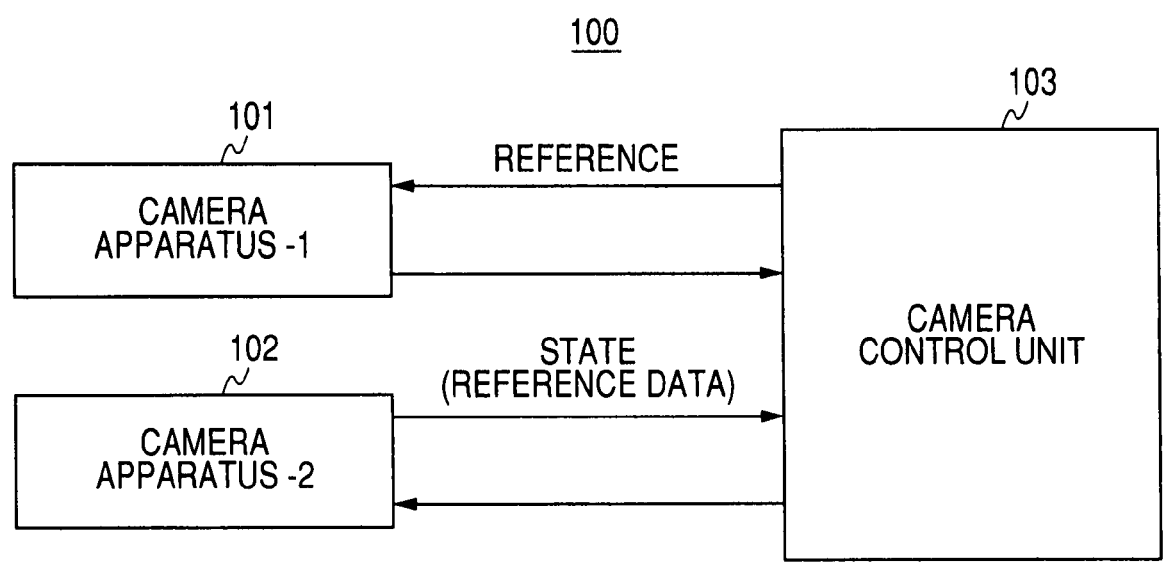
FIG. 1 is a diagram showing a minimum block structure of a camera system.

A mobile camera system as a form of a camera system according to an embodiment of the invention is shown in FIG. 1. A camera system 100 shown in FIG. 1 is shown as an example of a minimum structure thereof.

A Cam (camera apparatus)-1 (101) and a Cam (camera apparatus)-2 (102) are connected to a Camera Control Unit (C/U) 103.

It is assumed that the Cam-1 apparatus (101) is set as a reference (master) camera apparatus and the Cam-2 apparatus (102) is set as a slave camera apparatus to be adjusted. After the Cam-1 apparatus (101) and the Cam-2 apparatus (102) photograph a subject, respectively, the C/U 103 receives reference data (luminance and color states) from the Cam-1 apparatus (101) set as the master camera apparatus and directly transfers a value of the reference data to the other Cam-2 apparatus (102) as the slave camera apparatus. The Cam-2 apparatus (102) receives the reference data and adjusts an image on the basis of this reference data.

As the reference data, there are, for example, a luminance signal and a color signal. The Cam-2 apparatus (102) as the slave camera apparatus controls adjustment of shutter speed and a gain of an AFE (Analog Front End) gain control device using the luminance signal. The Cam-2 apparatus (102) adjusts a gain of an AWB (Auto White Balance) amplifier of a DSP color signal processing circuit and performs color adjustment using the color signal.

Figure 2B:
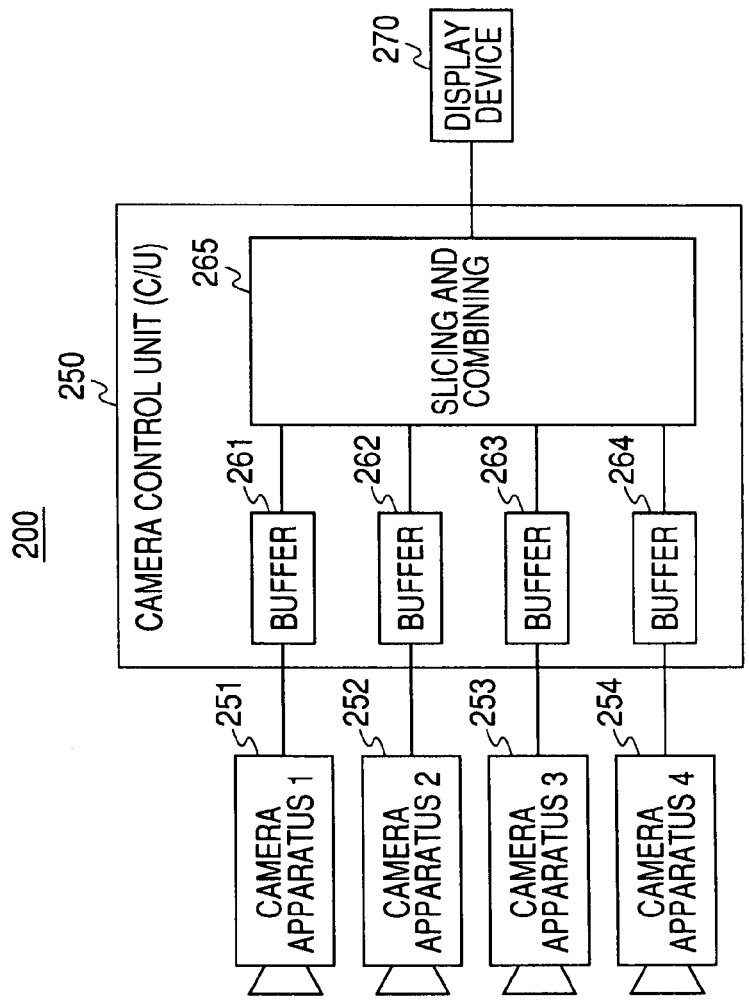
FIGS. 2A and 2B are schematic diagrams showing a system structure of a vehicle-mounted (mobile) camera apparatus.
Figure 2A:
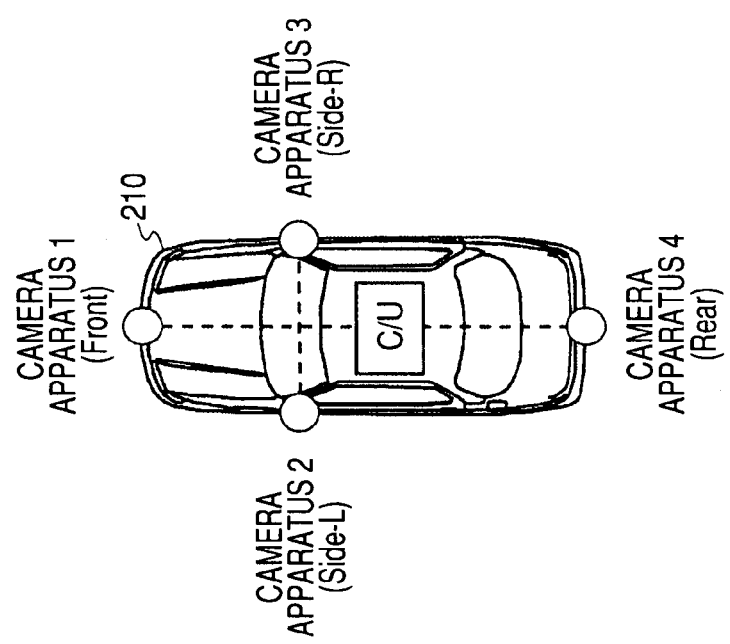

A block structure of a vehicle-mounted (mobile) camera system 200 according to another embodiment of the invention is shown in FIGS. 2A and 2B. In the case of the vehicle-mounted camera system 200, a mobile body is a vehicle.

In FIG. 2A, a structure of the vehicle-mounted camera system 200 is shown. A camera apparatus Cam1 (Front) is mounted in the front of a vehicle 210, a camera apparatus Cam2 (Side-L) is mounted on the left side of the vehicle 210, a camera apparatus Cam3 (Side-R) is mounted on the right side of the vehicle 210, and a camera apparatus Cam4 (Rear) is mounted on the rear of the vehicle 210.

In an example in FIG. 2A, the vehicle-mounted camera system 200 includes the four camera apparatuses Cam1 to Cam4. However, as shown in FIG. 1, basically, a camera system includes two or more camera apparatuses. Attaching positions and connecting positions of the respective camera apparatuses Cam1 to Cam4 are not limited to the positions shown in FIG. 2A.

A block structure of the vehicle-mounted camera, system 200 shown in FIG. 2A is shown in FIG. 2B. The vehicle-mounted camera system 200 in FIG. 2B includes camera apparatuses Cam-1 (251) to Cam-4 (254) mounted on the vehicle, a C/U (camera control unit) 250, and a display device 270;

The C/U 250 includes buffer circuits 261 to 264 and a slicing and combining circuit 265.

The camera apparatuses Cam-1 (251) to Cam-4 (254) are mounted with an automatic exposure control circuit (hereinafter also referred to as AE), auto-white balance control circuit (hereinafter also referred to as AWB), and the like and is capable of performing control of luminances and control of colors for each of the cameras.

The camera apparatuses Cam-1 (251) to Cam-4 (254) have a function of notifying a present AE state and a present AWB state and a function of receiving AE and AWB reference data from the C/U 250.

The C/U 250 includes a buffer (or a memory) for storing images outputted from the camera apparatuses Cam-1 (251) to Cam-4 (254). The C/U 250 has a function of performing slicing and combination of display portions of the images outputted from the camera apparatuses Cam-1 (251) to Cam-4 (254).

An image combined is displayed on the display device 270, for example, a monitor, of a car navigation or the like.

The C/U 250 also has a function of reading out the present AE state and the present AWB state from the camera apparatuses Cam-1 (251) to Cam-4 (254) and a function of transmitting an AE reference value (data) and an AWB reference value (data) to the camera apparatuses Cam-1 (251) to Cam-4 (254).

Figure 3:
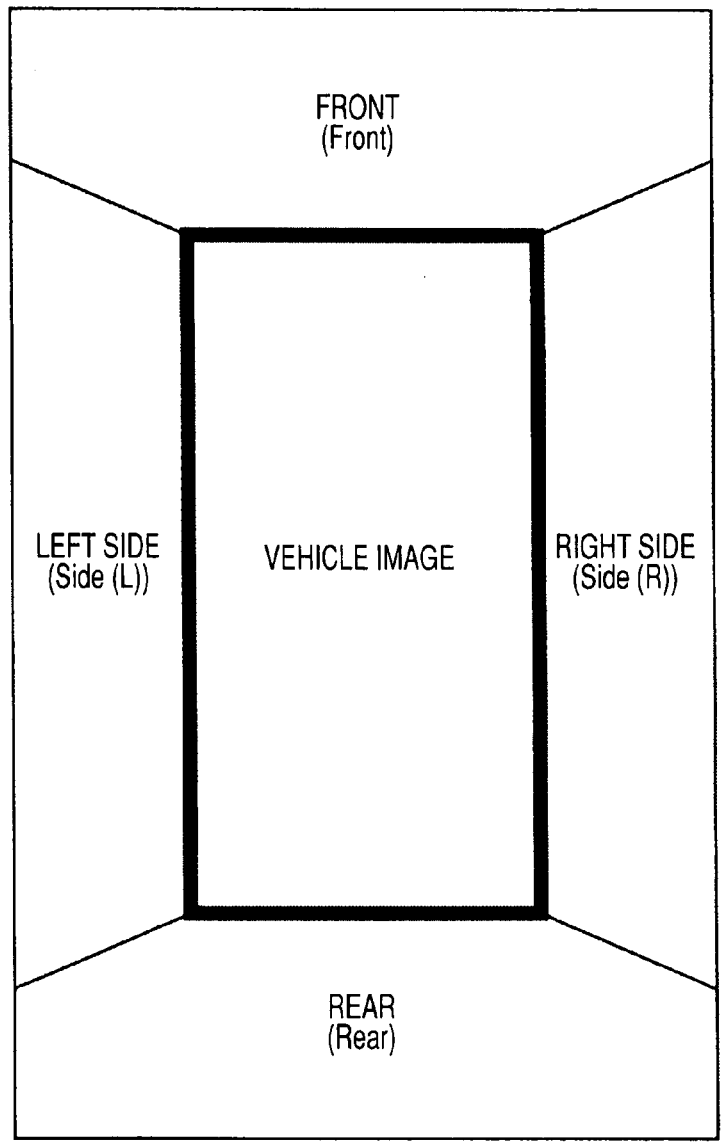
FIG. 3 is a diagram schematically showing a combined image combined by the vehicle-mounted camera apparatus.

An example of a combined image is shown in FIG. 3. This combined image is an example of an image obtained by connecting the four camera apparatuses shown in FIG. 2A. The number of camera apparatuses, slicing positions of images, and a combining method for combining images are not limited. In the combined image in FIG. 3, images are displayed in positions corresponding to the respective cameras around a vehicle image. However, it is possible to change the image positions and perform rotation and the like of the entire image using the C/U 250.

For example, an image for reference data generation photographed by the camera apparatus Cam-1 (251) set as a master and an image for combined image generation from this camera apparatus Cam-1 (251) may be the same or may be different.

Figure 4:
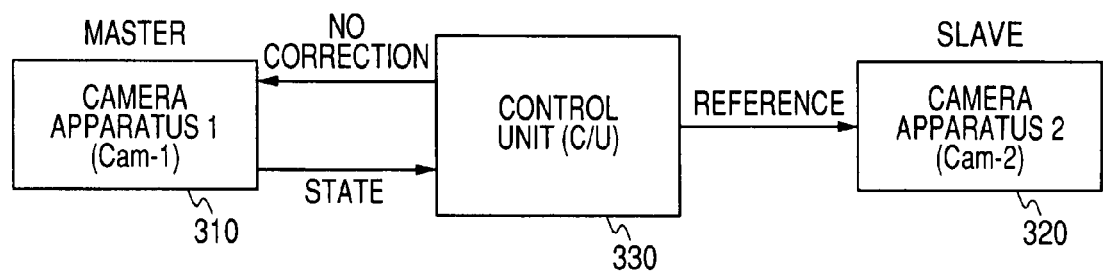
FIG. 4 is a diagram showing a block structure of a camera system in which two camera apparatuses are connected.

A camera system 300 including two camera apparatuses 310 and 320 as a minimum structure is shown in FIG. 4. In FIG. 4, actually, four or five camera apparatuses are provided. However, since a C/U 330 as a host apparatus is capable of controlling each of the camera apparatuses as a control system, in this explanation, the two camera apparatuses are provided.

In this camera system 300, operations performed when one camera apparatus (Cam-1 (310)) is set as a master and the other camera apparatus (Cam-2 (320)) is set as a slave will be explained. However, the master camera apparatus 310 is not determined unconditionally. The C/U 330 can appropriately change the master camera apparatus 310 according to conditions such as a location from time to time.

As operations of the C/U 330, the C/U 330 receives an imaging signal of the camera apparatus Cam-1 (310) set as the master and transmits, as reference data, the imaging signal to the camera apparatus Cam-2 (320) set as the slave. The C/U 330 executes this operation at a fixed period.

The C/U 330 can also transfer reference data "0" (indicating that no correction is performed) to the camera apparatus Cam-1 (310) set as the master.

In this case, since it is unnecessary to detect a state of the camera apparatus Cam-2 (320) set as the slave, communication is not always necessary. However, when the slave and the master are switched, it is necessary to transmit the "0" signal indicating that no correction is performed.

In the camera apparatus Cam-1 (310), since it is designated to perform no correction, no correction is performed in the AE and the AWB and a normal operation is performed.

On the other hand, in the camera apparatus Cam-2 (320), since the state of the camera apparatus Cam-1 (310) is received as reference data for correction, correction taking into account a value of the reference data is incorporated in automatic control.

The reference data outputted from the camera apparatus Cam-1 (310) and an image outputted from the camera apparatus Cam-2 (320) are combined to form an image via the C/U 330.

An image for reference data generation photographed by the camera apparatus Cam-1 (310) set as the master and an image for combined image generation from the camera apparatus Cam-1 (310) may be the same or may be different.

Operations of a vehicle-mounted (mobile) camera system in which plural camera apparatuses are connected (here, it is assumed that four camera apparatuses are connected) will be explained with reference to FIGS. 2A and 2B.

When a vehicle is moving forward, a place that a driver wants to photograph (check with a monitor) most is a position in Front (front).

In this case, the C/U 250 sets the Front camera apparatus Cam1 (251) as a master (a reference) and sets the Side-L (left) camera apparatus Cam-2 (252), the Side-R (right) camera apparatus Cam-3 (253), and the Rear (rear) camera apparatus Cam-4 (254) as slaves. The C/U 250 transmits data of colors and luminances of the Front (front) camera apparatus Cam-1 (251) to the Side-L, Side-R, and Rear camera apparatuses.

The Side-L camera apparatus Cam-2 (252), the Side-R camera apparatus Cam-3 (253), and the Rear camera apparatus Cam-4 (254) receive the color and luminance data of the Front camera apparatus Cam1 (251) via the C/U 250 as reference data and adjust colors and luminances in camera signal processing blocks in the camera apparatuses.

For the Rear camera apparatus Cam-4 (254), an average value of data of the Side-L camera apparatus Cam-2 (252) and the Side-R camera apparatus Cam-3 (253) may be set as master data.

Since the camera apparatuses perform control without judging attaching positions of the camera apparatuses, the C/U 250 can select the master camera apparatus Cam1 (251), select the slave camera apparatuses, and freely generate reference data transmitted to the slave camera apparatuses.

The C/U 250 can also use a gear of the vehicle (whether the vehicle is moving forward or backward) as a material of judgment on selection of the master camera apparatus Cam1 (251), judge the Front camera apparatus Cam1 (251) as a master when the vehicle is moving forward, and judge the Rear camera apparatus Cam-4 (254) as a master when the vehicle is moving backward.

Moreover, when all attached camera apparatuses are the same, the C/U 250 can set all the camera apparatuses as slaves, transmit same data of colors and luminances to all the camera apparatuses, and set the same control value in all the camera apparatuses.

In this way, in the vehicle-mounted camera system 200, the C/U 250 does not perform signal processing for an image and adjustment of luminance and color signals and the respective slave camera apparatuses independently adjust the luminance and color signals.

The vehicle-mounted camera systems have been described above. However, the invention is not limited to the mobile camera systems for a vehicle and the like. Evidently, it is also possible to apply the invention to systems other than the mobile body. For example, it is possible to establish the camera system including the plural camera apparatuses described above indoors or outdoors and combine images without a sense of incongruity about colors and luminances.

For example, an image for reference data generation photographed by the camera apparatus Cam1 (251) set as the master and an image for combined image generation from this camera apparatus Cam1 (251) may be the same or may be different.

A basic control principle for a camera apparatus will be described with reference to FIGS. 2A and 2B and FIG. 5. The respective camera apparatuses receive reference data transferred from the C/U 250, independently perform luminance and color adjustment in the respective camera apparatuses on the basis of the reference data received, and transfer adjusted images to the C/U 250. Thereafter, the images transferred from the respective camera apparatuses are combined and outputted to a not-shown display device and a combined image is displayed.

The C/U 250 transfers the reference data from the master camera apparatus 251 to the slave camera apparatuses 252 to 254. Besides, the C/U 250 also has a state notification function and the like.

A path for voluntarily notifying data concerning this state notification function is not present because of a communication specification. Thus, states are stored in buffer circuits 261 to 264 such as RAMs (Random Access Memories) in the camera apparatuses (251 to 254) and the C/U 250 refers to the states at a fixed period.

As the data stored in the RAMs in the camera apparatuses, there is data indicating an exposure state and a color state.

The exposure state will be described. An AE (Automatic Exposure) level as the exposure state is represented by the following equation.

$$AE\ \text{level} = \text{Shutter gain} + \text{Gain level}$$

Figure 5:
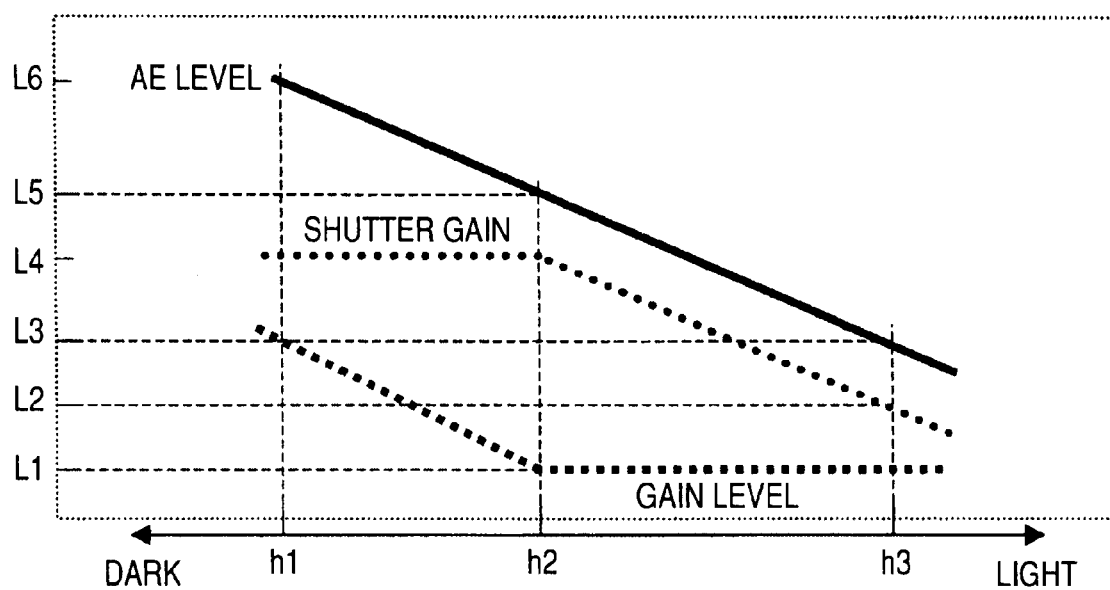
FIG. 5 is a graph showing a relation between an exposure state and a gain of a camera apparatus.

A specific characteristic of this AE level is shown in FIG. 5.

A relation among the AE level, the shutter gain, and the gain level is shown in FIG. 5. The abscissa indicates the exposure state (brightness) and the ordinate indicates the AE level, the shutter gain, and a gain of an AFE gain control device.

When the brightness is equal to or lower than h2, the shutter gain is fixed at a level L4. When the brightness changes from h2 to h3, the shutter gain decreases linearly. When the brightness reaches h3, the shutter gain decreases to a level L2. An exposure time of a light receiving element is controlled according to this shutter gain.

On the other hand, the gain level for controlling gains of an AFE and a digital signal processing circuit decreases linearly from a level L3 to a level L1 when the brightness is h1 to h2. However, when the brightness is h2 to h3, the gain level is fixed at the level L1.

When an AE level is measured by the master camera apparatus 251, the shutter gain and the gain level for gain control of the AFE and the digital signal processing circuit are determined according to the AE level. In other words, when the brightness is h1, the AE level is L6, the shutter gain is L4, and the gain of the AFE is L3. The shutter gain L4 and the gain L3 of the AFE are transferred to the slave camera apparatuses 252 to 254 via the C/U as luminance information of the reference data.

When the brightness is h2, the AE level is L5, the shutter gain is L4, and the gain of the AFE is L1. When the brightness is h3, the AE level is L3, the shutter gain is L2, and the gain of the AFE is L1.

In this way, the shutter gain and the gain of the AFE are determined as the reference data from the AE level measured by the master camera apparatus 251. This reference data is transferred to the slave camera apparatuses 252 to 254 via the C/U 250.

The respective camera apparatuses independently adjust the AE level in the camera apparatuses on the basis of this reference data.

In an example described below, other than the luminance signal, a color (signal) state is used as the reference data. After pre-white balance adjustment, in order to perform AWB adjustment for a new photographed image in OPDa (optical detectors) of camera apparatuses, an R/G, B/G coordinate based on a pre-white balance adjustment value are stored in advance. As a pre-white balance, reference white colors are photographed and subjected to AWB adjustment in the camera apparatuses 251 to 254 and adjustment data, for example, gain information of respective gain control circuits obtained at that point is stored in a storage device to eliminate manufacturing variation of the respective camera apparatuses.

Figure 6:
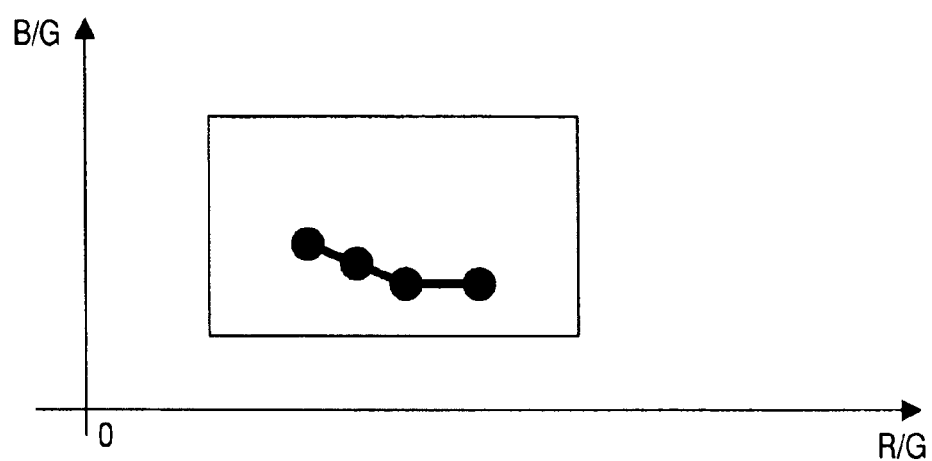
FIG. 6 is a diagram showing a coordinate position with respect to a color signal on a color coordinate.

A graph of a color (signal) state is shown in FIG. 6. As a color coordinate, the abscissa indicates R/G and the ordinate indicates B/G. R, G, and B are pixel signals obtained by a primary-color separating circuit and indicate a red signal, a blue signal, and a green signal of a pixel, respectively.

FIG. 6 shows a color state of AWBs (Auto White Balances) obtained by OPDs (optical detectors) of the respective camera apparatuses (Cam1 (251) to Cam4 (254)) converted into an R/G, B/G coordinate based on pre-white balance adjustment. Values obtained by this coordinate conversion are different in the respective camera apparatuses (Cam1 (251) to Cam4 (254)) and located in different positions on the coordinates.

Figure 7:
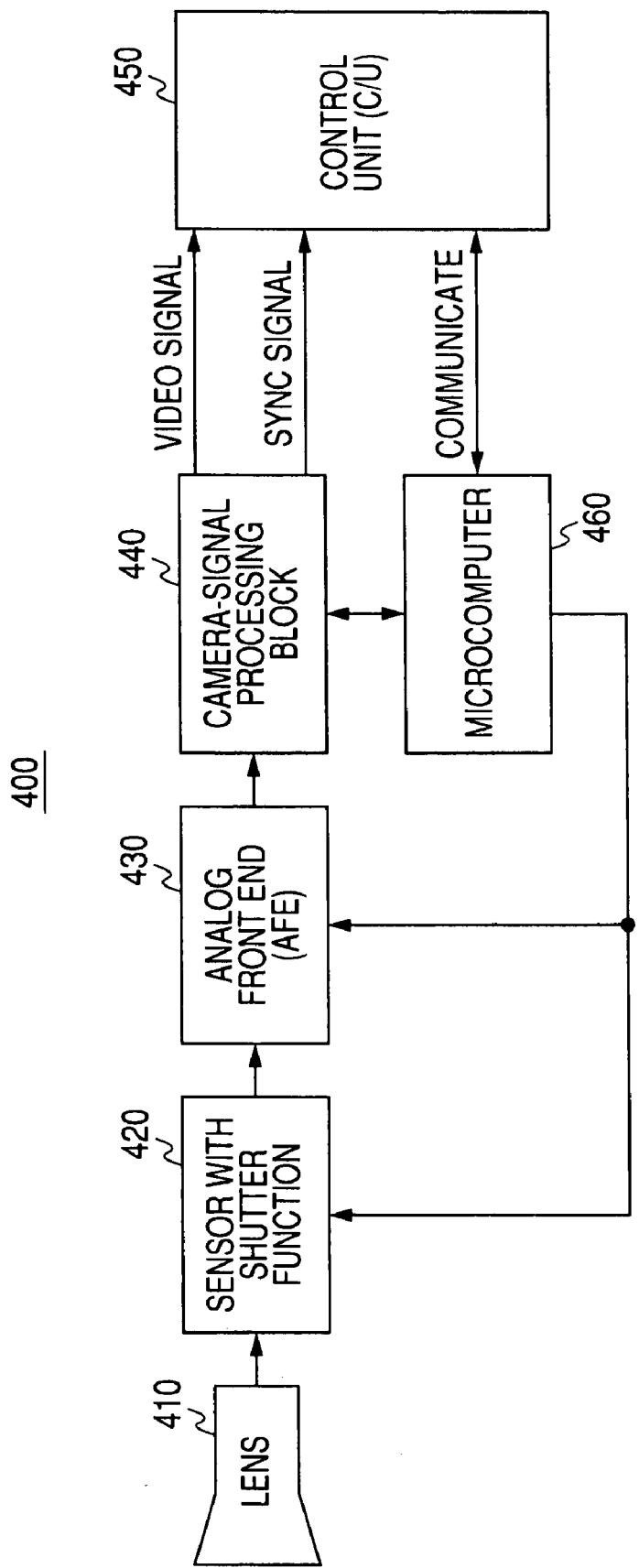
FIG. 7 is a diagram showing a block structure of a camera apparatus.

A block structure of a camera (imaging) apparatus 400 according to another embodiment of the invention is shown in FIG. 7.

The camera apparatus 400 includes a lens 410, a sensor with shutter function 420, an AFE (Analog Front End) 430, a camera-signal processing block 440, a C/U (Camera Control Unit) 450, and a microcomputer 460.

The lens 410 condenses light from the outside and focuses an image on an imaging element. The sensor with shutter function 420 converts the light into an electric signal in the imaging element and changes an accumulation time of charges using an electronic shutter.

The AFE 430 removes noise using a correlated double sampling circuit and converts analog signals inputted from an AGC (Auto Gain Control) circuit and a sensor into digital signals.

The camera-signal processing block 440 converts an input signal supplied from the sensor into a video signal.

The C/U 450 is supplied with the video signal and a synchronization (SYNC) signal from the camera-signal processing block 440. The C/U 450 has functions of setting (selecting) a master camera apparatus, transmitting reference data concerning luminance and color signals transferred from the mater camera apparatus to slave camera apparatuses, and combining images sent from the respective camera apparatuses. Control of the respective camera apparatuses is performed by communicating with the microcomputer 460.

The microcomputer 460 is connected to the sensor with shutter function 420, the AFE 430, and the camera-signal processing block 440. The microcomputer 460 sends a control signal related to the reference data supplied from the C/U 450 to the slave camera apparatuses. The respective slave camera apparatuses independently control the luminance and color signals.

Operations of the camera apparatus 400 employing the reference data indicating the exposure state and the color state will be described.

A shutter gain of the exposure state indicates a control value of an electronic shutter of the sensor with shutter function 420 in FIG. 7. A gain level of the exposure state indicates a control value of an AGC circuit of the AFE 430 and a control value of a digital gain amplifier in the camera-signal processing block 440.

When reference data supplied from the master camera apparatus is transferred to the microcomputer 460 of another camera apparatus via the C/U 450, the microcomputer 460 generates a shutter gain and a gain level corresponding to the exposure state and supplies a control signal for controlling the shutter gain to the sensor with shutter function 420 to adjust a gain (a period) of the electronic shutter shown in FIG. 5.

The microcomputer 460 supplies a control voltage for a gain level to the AGC circuit of the AFE 430 to control a gain or supplies a control signal for a gain level to the camera-signal processing block 440 to control a digital gain of a digital-signal processing circuit.

The microcomputer 460 also supplies reference data indicating the color state to the camera-signal processing block 440 to adjust a color processing circuit.

In this way, instead of performing luminance and color adjustment for a combined image in the C/U 250, adjustment of luminance and color signals is performed in the respective camera apparatuses using the reference data transferred from the reference camera apparatus via the C/U 250.

Figure 8:
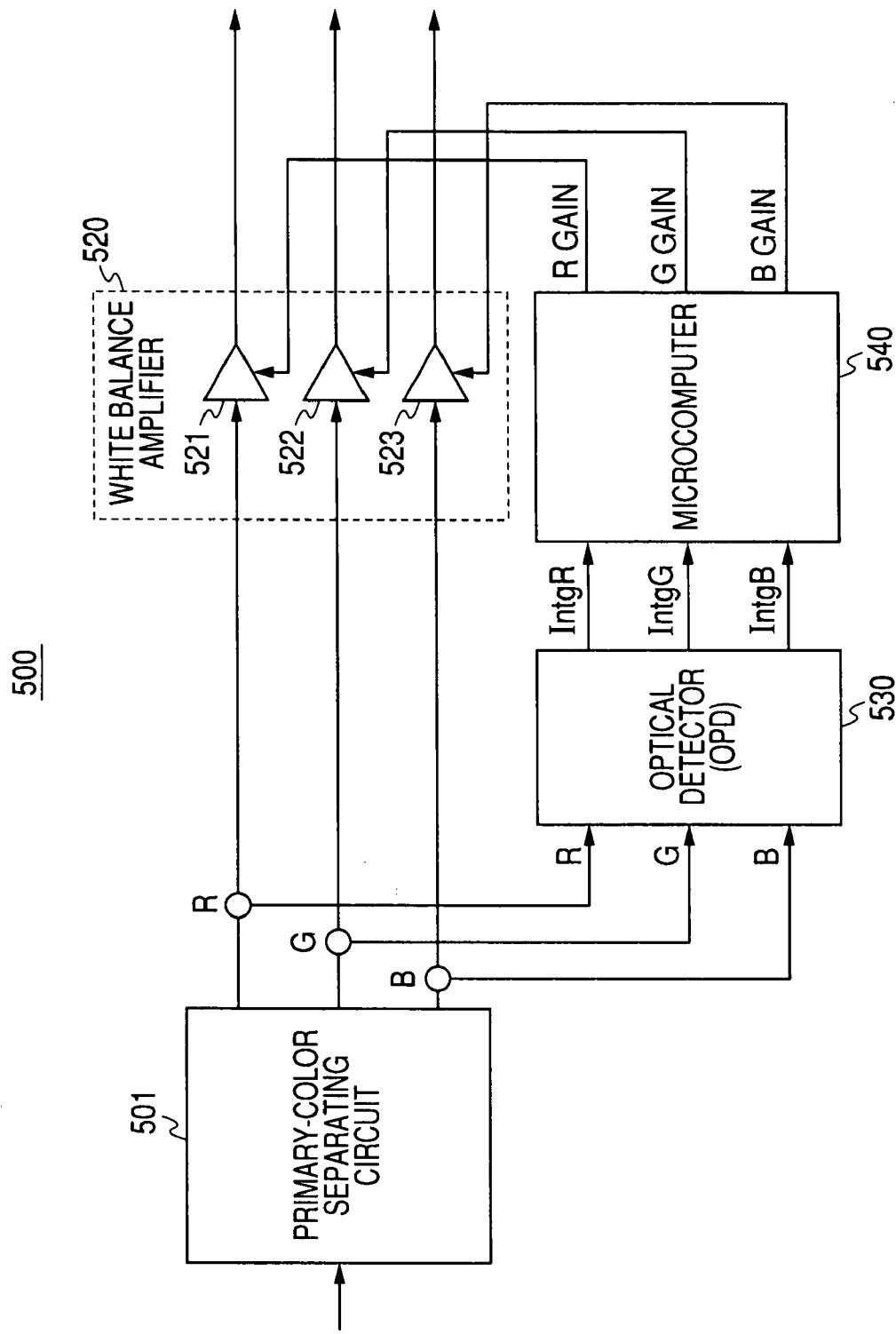
FIG. 8 is a diagram showing a circuit configuration of a color signal processing block of the camera apparatus shown in FIG. 7.

FIG. 8 is a block diagram of a color-signal processing circuit 500 forming a part of the camera-signal processing block 440 shown in FIG. 7.

The color-signal processing circuit 500 includes a primary-color separating circuit 501, a WB (White Balance) amplifier 520, an OPD (optical detector) 530, and a microcomputer 540. The WB amplifier 520 includes gain control amplifiers 521 to 523 that control gains of the primary colors R, G, and B.

The primary-color separating circuit 501 separates a digital signal outputted from an AD (Analog Digital) converter provided in the AFE 430 into the primary color signals R, G, and B of red, blue, and green and outputs these primary color signals R, G, and B to the gain control amplifiers 521 to 523, respectively.

The primary color signals R, G, and B are also supplied to the OPD 530 in order to perform white balance adjustment.

The OPD 530 has a circuit that integrates the primary color signals R, G, and B for each field or frame. Therefore, the OPD 530 calculates integrated value data IntgR, IntgG, and IntgB in, for example, a unit of field of the primary color signals R, G, and B and outputs these integrated value data IntgR, IntgG, and IntgB to the microcomputer 540.

The microcomputer 540 has a built-in memory and an external memory. The microcomputer 540 executes processing such as coordinate conversion, setting of a lead-in frame of a color temperature and control of the lead-in frame, color temperature control, and gain setting for each of R, G, and B in accordance with programs read out from these memories.

The gain control amplifiers 521 to 523 constituting the WB amplifier 520 are capable of changing gains when necessary on the basis of gain values, an R gain, a G gain, and a B gain outputted from the microcomputer 540.

The primary color signal R outputted from the primary-color separating circuit 501 is supplied to an input of the gain control amplifier 521. A gain of amplification or attenuation is controlled using the R gain outputted from the microcomputer 540.

The primary color signal G outputted from the primary-color separating circuit 501 is supplied to an input of the gain control amplifier 522. A gain of amplification or attenuation is controlled using the G gain outputted from the microcomputer 540.

The primary color signal B outputted from the primary-color separating circuit 501 is supplied to an input of the gain control amplifier 523. A gain of amplification or attenuation is controlled using the B gain outputted from the microcomputer 540.

A circuit configuration of the color-signal processing circuit 500 shown in FIG. 8 adopts a feed forward system.

In general, as a feedback structure often adopted, output signals of the gain control amplifiers 521 to 523 of the WB amplifier 520 are fed back to the OPD 530, levels of the output signals and the primary color signals R, G, and B outputted from the primary-color separating circuit 501 are compared, respectively, a control signal is generated to control the WB amplifier 520 in accordance with the difference signal.

On the other hand, since the color-signal processing circuit 500 in FIG. 8 adopts the feed forward structure, a response characteristic of a system is improved compared with the feedback structure.

Operations of the color-signal processing circuit 500 will be explained. In FIG. 8, an image signal obtained from the sensor with shutter function 420 and the AFE 430 shown in FIG. 7 is subjected to signal processing and inputted to the primary-color separating circuit 501 as a digital signal.

In the primary-color separating circuit 501, the digital signal inputted is separated into primary color signals of R (red), G (green), and B (blue). The primary color signals R, G, and B separated are inputted to the WB amplifier 520. The primary color signals R, G, B separated are also supplied to the optical detector (OPD) 530 to be used in white balance adjustment. The OPD 530 has an integrating circuit that integrates the primary color signals R, G, and B for each field.

Integrated value data obtained by the OPD 530 is supplied to the microcomputer 540 at the next stage. The microcomputer 540 outputs data of R/G and B/G on the basis of respective integrated value data of R, G, and B supplied from the OPD 530 and sets respective gains of an R signal, a G signal, and a B signal on the basis of R/G, B/G, and a pre-white balance adjustment value. These operations are executed by the microcomputer 540, a DSP (digital signal arithmetic unit), or the like.

The pre-white balance adjustment indicates adjustment for determining a reference white color under a reference color temperature.

An auto correction function for controlling luminances and colors of the camera apparatuses on the basis of a luminance state and a color state will be explained.

Data received from the C/U are the AE level and the coordinate position of the AWB described above. As a simple case, the C/U is capable of adjusting colors and luminances by extracting reference data from a camera apparatus set as a master and directly transferring a value of the reference data to other camera apparatuses.

The C/U sends a flag indicating execution of luminance and color adjustment and a flag indicating non-execution of luminance and color adjustment to the camera apparatuses to control an adjustment mode. For example, when "0" is designated as the AE level and the AWB coordinate position, the C/U defines this as a mode for prohibiting auto correction. The C/U is capable of turning correction OFF by setting data to "0". On the other hand, when information on the AE level and the AWB coordinate position other than "0" is transferred, the C/U automatically judges that this is the adjustment mode and executes adjustment.

First, operations of auto correction of an AE (automatic exposure) control device 600 will be explained with reference to FIG. 9. This AE control device 600 is provided in all of the master camera apparatus and the other slave camera apparatuses.

Figure 9:
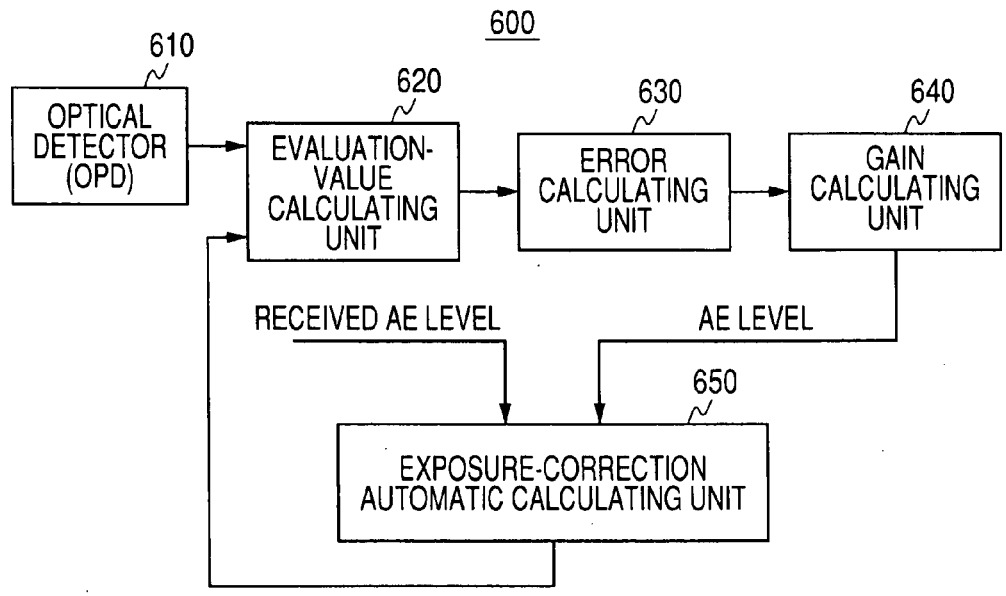
FIG. 9 is a diagram showing a block structure of an automatic exposure control device of the camera apparatus.

The AE control device 600 in FIG. 9 includes an OPD (optical detector) 610, an evaluation-value calculating unit 620, an error calculating unit 630, a gain calculating unit 640, and an exposure-correction automatic calculating unit 650. It is possible to perform processing by the evaluation-value calculating unit 620, the error calculating unit 630, the gain calculating unit 640, and the exposure-correction automatic calculating unit 650 among these components with the microcomputer, the DSP, or the like built in the camera-signal processing block described above. Besides, it is also possible to realize the processing with hardware. Therefore, the processing may be performed by any one of the microcomputer, the DSP, and the hardware.

The OPD 610 integrates, as described above, the separated primary color signals R, G, and B for each field or frame and detects a luminance signal on the basis of integrated data of the signals.

The evaluation-value calculating unit 620 calculates levels of a luminance signal outputted from the OPD 610 and a luminance signal outputted from the exposure-correction automatic calculating unit 650, respectively.

The error calculating unit 630 compares an evaluation value of the luminance signal outputted from the evaluation-value calculating unit 620 and an evaluation value of the luminance signal outputted from the exposure-correction automatic calculating unit 650 and calculates an error.

The gain calculating unit 640 calculates, on the basis of a result of the error calculation, a luminance signal amount, i.e., an AE level to correct the luminance signal amount in the slave camera apparatuses.

The exposure-correction automatic calculating unit 650 is supplied with AE levels outputted from the gain calculating unit 640, for example, an AE level transferred from the master camera apparatus and an AE level supplied from the gain calculating unit 640, respectively, and calculates a shutter gain.

Operations of the AE control device 600 shown in FIG. 9 will be explained. This AE control device 600 has, in addition to the normal exposure control, a function of performing fine control using, for example, AE data received from the master camera apparatus.

The AE control device 600 adopts a system for increasing or decreasing an exposure correction level according to a ratio of an AE level of a present own camera apparatus (e.g., the slave camera apparatus) and an AE level transferred (reference data). The AE control device 600 calculates, from a result of calculating each frame gain, an AE level of the own camera apparatus and stores the AE level in, a RAM of the camera apparatus.

As adjustment parameters for performing AE correction, there are, for example, a maximum range of an exposure correction level, a step of changing an exposure correction level, a frame period in which the exposure correction level is changed, a level difference not corrected, and a dead zone width. It is possible to appropriately set these values according to circumstances.

As a method of correcting an exposure level of the own camera apparatus (e.g., the slave camera apparatus), there is a method of comparing an AE level of the camera apparatus and an AE level received from the master camera apparatus and increasing or decreasing a level of exposure correction by a step amount set in advance to adjust the level. There is also a method of adjusting a step amount to be close to "0" when the level difference not corrected is equal to or smaller than a set reference or when a flag is set and an received AE level is "0" (correction OFF).

When an AE level that should be corrected is determined, a shutter gain and a gain level are determined from the graph indicating the exposure state shown in FIG. 5 and a luminance signal is controlled on the basis of the shutter gain and the gain level.

As shown in FIG. 5, for example, when brightness is h1, since the AE level is "L6", the shutter gain is determined as "L4" and the gain level is determined as "L3". A control signal corresponding to the shutter gain "L4" is supplied to the sensor with shutter function 420 and a shutter time and the like are adjusted. An analog control voltage and a digital control voltage corresponding to the gain "L3" are supplied to the AFE 430 and the camera-signal processing block 440, respectively, and gains are controlled.

When brightness is h2, since the AE level is "L5", the shutter gain is determined as "L4" and the gain level is determined as "L1". A control signal corresponding to the shutter gain "L4" is supplied to the sensor with shutter function 420 and a shutter time and the like are adjusted.

An analog control voltage and a digital control voltage corresponding to the gain "L1" are supplied to the AFE 430 and the camera-signal processing block 440, respectively, and gains are controlled. When brightness is h3, gains are controlled in the same manner.

When there are plural slave camera apparatuses, such adjustment of a luminance state is independently performed in the other slave camera apparatuses.

A luminance of the slave camera apparatus is automatically calculated on the basis of the AE level of the reference data of the master camera apparatus by correcting an AE level of the slave camera apparatus in accordance with a correction ratio set in advance.

As a result, even if images photographed by the camera apparatuses are transferred via the C/U and then the images are combined by performing luminance adjustment in conjunction with color signal adjustment described above, since a level difference of luminance and color signals in joint portions of the images is eliminated, it is possible to reduce a sense of incongruity.

Figure 10:
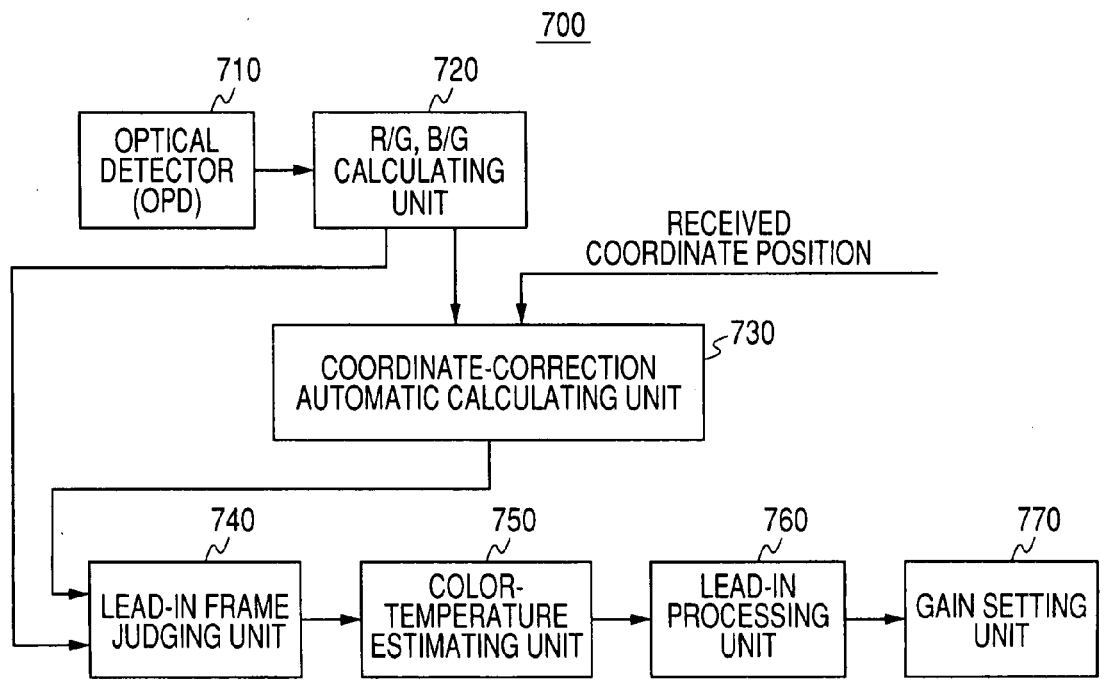
FIG. 10 is a diagram showing a block structure of an automatic white balance device of the camera apparatus.
Figure 11:
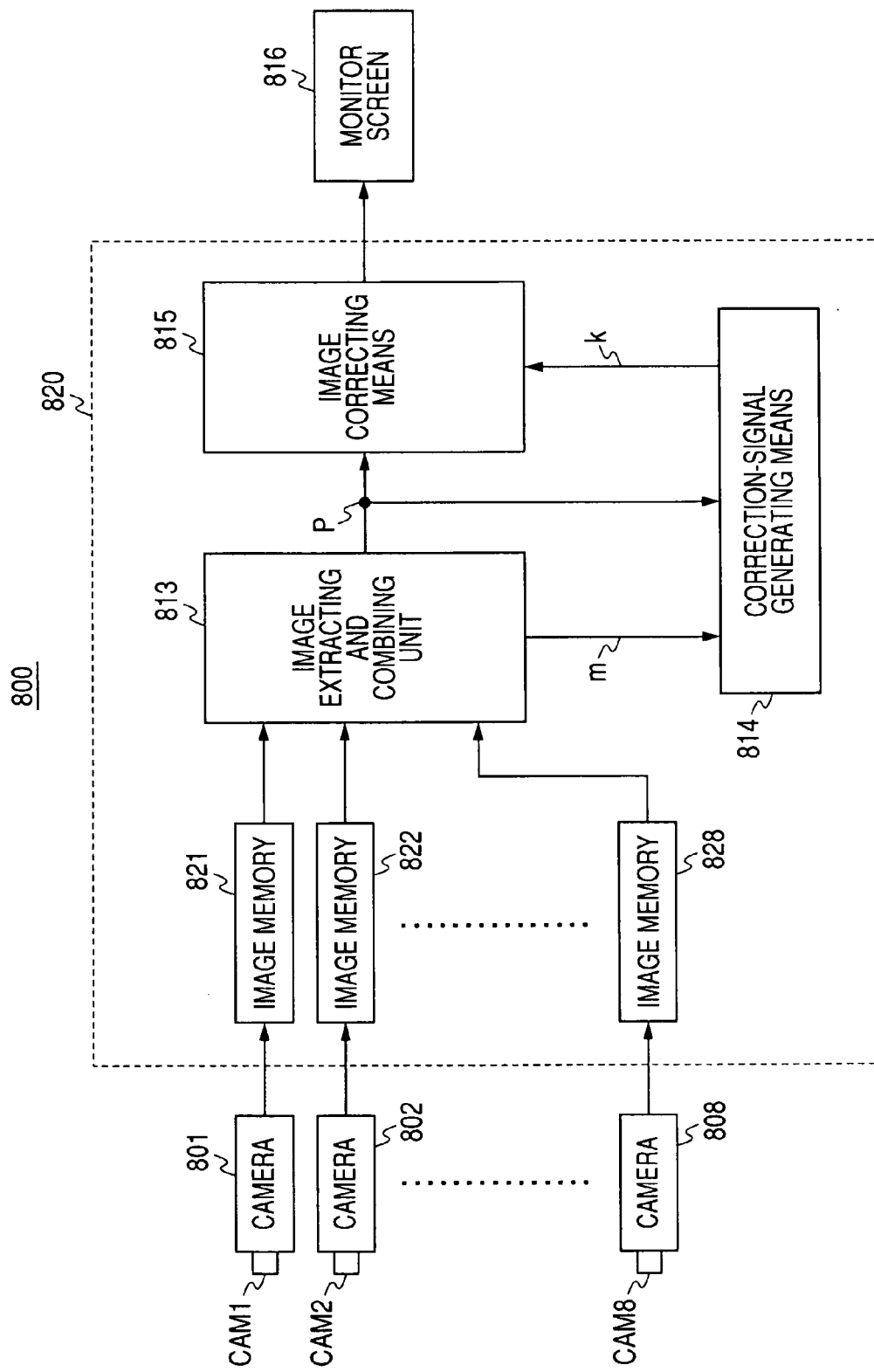
FIG. 11 is a diagram showing a block structure of an image combining and displaying device of a camera apparatus in the past.

A block structure of an AWB control device 700 according to another embodiment of the invention is shown in FIG. 10.

This AWB control device 700 includes an OPD 710, an R/G, B/G calculating unit 720, a coordinate-correction automatic calculating unit 730, a lead-in frame judging unit 740, a color-temperature estimating unit 750, a lead-in processing unit 760, and a gain setting unit 770. The units other than the OPD 710 can be constituted by hardware or can be constituted by software employing a microcomputer or a control device such as a DSP.

The R/G, B/G calculating unit 720 subjects inputted color information (signal) to arithmetic processing using software or hardware. There are various representations of the color information. For example, B/G is set on one of coordinate axes and R/G is set on the other to represent the color information on this coordinate.

Color information to be represented on the R/G and B/G axes is calculated from R, G, and B signals of primary color signals supplied from the OPD 710.

The coordinate-correction automatic calculating unit 730 is supplied with a calculation result (a coordinate position) of R/G and B/G obtained from the own camera apparatus (the slave camera apparatus) and a coordinate position (R/G, B/G)

transferred from the master camera apparatus and automatically calculates a correction amount from both the coordinate positions.

In the lead-in frame judging unit 740, a limit frame at the time of color adjustment is set on a color coordinate (R/G, B/G). The lead-in frame judging unit 740 corrects a coordinate position of an input image according to a relation between a coordinate position based on present pre-white balance adjustment and the coordinate position transferred and judges whether this corrected value is within the lead-in limit frame.

When the corrected value is within the lead-in limit frame, the lead-in frame judging unit 740 proceeds to a calculation for estimating a color temperature from the value. When the corrected value is outside the lead-in limit frame, the lead-in frame judging unit 740 judges a lead-in limit frame from the coordinate position before the correction (a coordinate position obtained from the OPD 710) and performs color temperature estimation from a value of the lead-in limit frame.

An area within the lead-in limit frame is set as an area for color adjustment and an area outside the lead-in limit frame is set as a no-adjustment area. As this lead-in limit frame, a frame of a square or the like is set on the color coordinate.

The color-temperature estimating unit 750 is supplied with a corrected color signal supplied from the lead-in frame judging unit 740 or a color signal outputted from the OPD 710 and estimates a color temperature using a solid radiation curve represented on the color coordinate with R/G and B/G set as the coordinate axes.

When the color signal inputted on the color coordinate (R/G, B/G) is within the lead-in limit frame, the lead-in processing unit 760 performs a lead-in operation from the inputted coordinate position in an origin "O" direction and performs adjustment of a white balance. On the other hand, when the color signal is outside the lead-in limit frame, the lead-in processing unit 760 performs normal adjustment of a white balance.

The gain setting unit 770 outputs gains for controlling gains of the gain control amplifiers 521 to 523, which constitute the white balance (WB) amplifier 520, with respect to the color signal outputted from the lead-in processing unit 760.

Operations of the AWB control device 700 in FIG. 10 will be explained.

The AWB control device 700 has, in addition to the normal white balance control, a function of performing fine control using reference data received from the master camera apparatus.

The AWB control device 700 slightly changes a coordinate position of the AWB control device 700 according to a relation between a coordinate position based on a pre-white balance adjustment value of the present own slave camera apparatus and a coordinate position transferred from the master camera apparatus via the camera control unit. Then, the AWB control device 700 processes setting of a lead-in frame and color temperature estimation in this order.

When R/G data received from the master camera apparatus is represented as received R/G data and R/G data based on the pre-white balance adjustment value of the own slave camera apparatus is represented as own R/G data, an expression for calculating R/G is described below. B/G is also calculated by the same expression and corrected.

$$\text{Own } R/G + ((\text{Received } R/G - \text{Own } R/G) * (\text{Maximum ratio of a correction amount}/255))$$

$$\text{Own } B/G + ((\text{Received } B/G - \text{Own } B/G) * (\text{Maximum ratio of a correction amount}/255)) \qquad (1)$$

where * represents a multiplication sign.

In Expression (1), it is possible to arbitrarily change the maximum ratio of a correction amount between 0 and 255. It is possible to change a correction width to, for example, five steps, ten steps, and the like.

When the maximum ratio of a correction amount is 0 in Expression (1), a correction result is own R/G, own B/G. Thus, correction of the own slave camera is not performed.

When the maximum ratio of a correction amount is 128 (50%), a correction result is own R/G+(1/2)*(received R/G−own R/G), own B/G+(1/2)*(received B/G−own B/G). This is a value of a color signal obtained when an intermediate (50% correction) position of a coordinate position on a color coordinate obtained in the own camera apparatus and a coordinate position transferred from the master camera apparatus is set as a correction amount.

When the maximum ratio of a correction amount is 255 (100%), a correction result is own R/G+(received R/G−own R/G), own B/G+(received B/G−own B/G)).

The lead-in frame judging unit 740 judges whether the corrected color signal is within an area of the lead-in frame or outside the area.

When a coordinate of the corrected color signal is within the lead-in limit frame, the lead-in frame judging unit 740 proceeds to a calculation for estimating a color temperature from the value. On the other hand, when a coordinate of the corrected color signal is outside the lead-in limit frame, the lead-in frame judging unit 740 judges a lead-in limit frame from the coordinate position before the correction (a coordinate position originally calculated from the OPD 710 of the own slave camera apparatus) and performs color temperature estimation from a value of the lead-in limit frame.

Lead-in processing is performed after the color temperature estimation is performed. As a result gains are set. When the gains are set, the microcomputer 540 or the like shown in FIG. 8 generates control signals for an R gain, an G gain, and a B gain, supplies the control signals to the gain control amplifiers 521 to 523 constituting the WB amplifier 520, performs control of gains, and performs white balance adjustment.

Since the color adjustment is performed in the respective slave camera apparatuses on the basis of the reference data in this way, it is possible to reduce a sense of incongruity of tints when images photographed by the respective camera apparatuses are combined.

The AE control device 600 and the AWB control device 700 are included in the respective camera apparatuses. The C/U (103, 250, or 330) is set in the vehicle. When the camera apparatuses are mounted on the vehicle, it is possible to set the camera apparatuses in arbitrary positions. FIG. 2A is an example in which the camera apparatuses are set in Front (front), Side-L (left), Side-R (right), and Rear (rear), respectively. However, it is not always necessary to limit positions of the camera apparatuses to these positions. The number of camera apparatuses to be set does not always have to be four and only has to be at least two.

In this way, at least two camera apparatuses are set, the camera apparatuses are mounted on a mobile body such as a vehicle, a ship, or an airplane, and one of the camera apparatuses is set as a master camera apparatus. The master camera apparatus does not always have to be limited to the camera set in the front of the vehicle as shown in FIG. 2A. For example, the camera apparatus set in Rear (rear) may be set as a master.

When the vehicle moves backward, it is possible to use the Rear camera apparatus as a master and combine images with a rear image as a reference.

Besides, it is also possible to set, for example, the two camera apparatuses in Side-L and Side-R as masters. As reference data at the time when the two camera apparatuses are set as masters, reference data obtained by averaging luminance and color signals obtained from the Side-L and the Side-R camera apparatuses is used. Luminances and colors of the other slave camera apparatuses, for example, the Front camera apparatus and the Rear camera apparatus are corrected with the averaged reference data as a reference.

Therefore, the master camera apparatus does not have to be fixed before correction of luminances and colors is performed. It is also possible to set the master camera apparatus according to change of a gear ratio corresponding to a direction in which the vehicle moves.

The master camera apparatus does not always have to be determined. When the master camera apparatus is not set, the same correction amount may be set for all the camera apparatuses.

Moreover, it is also possible to process data transferred from the master camera apparatus on the C/U side and output the data to the respective camera apparatuses. Thus, it is possible to set the same control values of colors and luminances for all the camera apparatuses by transmitting the same data of colors and luminances to all the camera apparatuses.

As described above, according to the embodiments of the invention, the respective camera apparatuses are properly controlled and clear images are outputted. It is possible to reduce a sense of incongruity about colors and brightness in joint portions of images.

By making it possible to realize the above, select on which of colors and luminances importance should be placed, and adjust a balance between the colors and the luminances, it is possible to independently control the adjustment of the colors and the luminances in the respective camera apparatuses. The respective camera apparatuses can independently control the adjustment of the colors and the luminances without being aware of attaching positions thereof.

The camera apparatuses themselves can operate regardless of a mobile body and camera apparatuses arranged in different locations and can adjust colors and luminances without limiting the number of camera apparatuses connected.

It is possible to reduce communication loads between the camera apparatuses and the C/U by limiting data received from the C/U to only data of colors and luminances.

It should be understood by those skilled in the art that various modifications, combinations, sub-combinations, and alterations may occur depending on design requirements and other factors insofar as they are within the scope of the appended claims or the equivalents thereof.

What is claimed is:

1. A mobile camera system including at least first and second cameras mounted on a mobile body and a camera control unit that combines images photographed by said first and second cameras, wherein
   reference data obtained by the first camera apparatus is transferred to the second camera via said camera control unit,
   signal processing is performed in the second camera on the basis of the reference data transferred to generate a corrected image, and
   an image from the first camera and the corrected image outputted from the second camera are combined to output a combined image;
   wherein the second camera performs adjustment of luminance and colors according to the reference data, and further wherein the camera control unit sets the first camera apparatus as the reference camera and image reference data is transferred from the reference camera to the remaining cameras, and further wherein the camera control unit selectively changes a source of the reference data from the first camera apparatus to a different camera apparatus; and
   wherein a third camera receives the reference data obtained by the first camera and a fourth camera receives average image signal processing data used by the second and third cameras for use as master image signal processing data for the fourth camera.

2. A mobile camera system according to claim 1, wherein the second camera performs signal processing on the basis of the reference data and performs adjustment of luminance and colors.

3. A mobile camera system according to claim 1, wherein the camera control unit sets the reference data received from the first camera apparatus as data for determining colors and brightness, transfers the reference data to the second camera apparatus, and independently performs adjustment of luminance and colors in the second camera apparatus.

4. A mobile camera system according to claim 3, wherein the camera control unit processes the reference data in the camera control unit and transmits same data of colors and brightness to the plural camera apparatuses including the first camera apparatus.

5. The mobile camera system of claim 1, wherein image data from a plurality of cameras is combined in order to provide a composite image.

6. A mobile camera system comprising:
   a mobile body;
   plural cameras that are set in the mobile body and have signal processing units that adjust image signals, respectively;
   wherein the camera control unit sets the first camera apparatus as the reference camera and image reference data is transferred form the reference camera to the remaining cameras and
   a display device on which images outputted from the first camera apparatus and the second camera apparatus are combined and the combined image is displayed, and further wherein the camera control unit selectively changes a source of the reference data from the first camera apparatus to a different camera apparatus; and
   wherein a third camera receives the reference data obtained by the first camera and a fourth camera receives average image signal processing data used by the second and third cameras for use as master image signal processing data for the fourth camera.

7. A mobile camera system according to claim 6, wherein the camera control unit arbitrarily selects the first camera apparatus set as a reference out of the plural cameras and transfers the reference data to the second camera apparatus.

8. A mobile camera system according to claim 6, wherein the first camera apparatus changes the reference data output from the first camera apparatus.

9. A mobile camera system according to claim 6, wherein
   the mobile body is a vehicle,
   images photographed by the camera apparatuses are adjusted on the basis of the reference data, and
   an adjusted combined image is displayed on a display device in the vehicle.

10. A mobile camera system according to claim 6, wherein, in the signal processing unit of the second camera apparatus, a luminance signal is controlled by an element exposing unit and a signal-gain control unit.

11. A mobile camera system according to claim 6, wherein the signal processing unit of the second camera apparatus has a color-signal processing circuit and sets a lead-in frame on a color coordinate to adjust a white balance.

12. A mobile camera system according to claim 11, wherein the color-signal processing circuits includes:
- a coordinate calculating unit that converts an image signal supplied from an optical detector into a color coordinate;
- a coordinate-correction automatic calculating unit that is inputted with coordinate position data and reference coordinate data outputted from the color-coordinate calculating unit and calculates a correction amount with respect to the reference coordinate data;
- a color-temperature estimating unit that estimates a color temperature from coordinate data outputted from the coordinate-correction automatic calculating unit; and
- a gain setting unit that calculates a gain for correcting a white balance from the color temperature outputted from the color-temperature estimating unit.

13. A mobile camera system according to claim 12, wherein the color-signal processing circuit further includes a lead-in frame judging unit and adjusts a white balance when input coordinate data is within the lead-in frame.

14. A mobile camera system according to claim 6, wherein the signal processing unit has an automatic exposure control unit, and
the automatic exposure control unit includes:
- an evaluation-value calculating unit that is supplied with a luminance signal supplied from an optical detecting unit and a corrected luminance signal and calculates a present luminance state;
- an error calculating unit that calculates a difference between a present luminance signal and the corrected luminance signal on the basis of a calculation value output from the evaluation-value calculating unit;
- a gain calculating unit that calculates gains of the luminance signals using a difference signal outputted from the error calculating unit; and
- an exposure-correction automatic calculating unit that is supplied with a luminance signal and reference data inputted from the gain calculating unit and calculates a correction amount of a luminance signal with respect to the reference data.

15. A mobile camera system according to claim 14, wherein the gain calculating unit calculates gains of exposure control and gain control.

16. The mobile camera system of claim 6, wherein image data from a plurality of cameras is combined in order to provide a composite image.

17. A camera system comprising:
a first camera apparatus; and
a second camera apparatus, wherein
the first camera apparatus sends reference data to the second camera apparatus,
the second camera apparatus generates a corrected image on the basis of a photographed image and the reference data, and
a first image from the first camera apparatus and the corrected image are combined by a control means to generate a combined image, wherein the camera control unit sets the first camera apparatus as the reference camera and image reference data is transferred form the reference camera to the remaining cameras, and further wherein the camera control unit selectively changes a source of the reference data from the first camera apparatus to a different camera apparatus; and
wherein a third camera receives the reference data obtained by the first camera and a fourth camera receives average image signal processing data used by the second and third cameras for use as master image signal processing data for the fourth camera.

18. A camera system according to claim 17, wherein the second camera apparatus changes the reference data outputted from the first camera apparatus to color and luminance signals.

19. A camera system according to claim 17, wherein an image as a basis of the reference data photographed by the first camera apparatus is the same as the first image combined for generating the combined image.

* * * * *